July 30, 1940.　　　C. V. JOHNSON　　　2,209,603
SHOCK STRUT
Filed Oct. 11, 1934　　　3 Sheets-Sheet 1
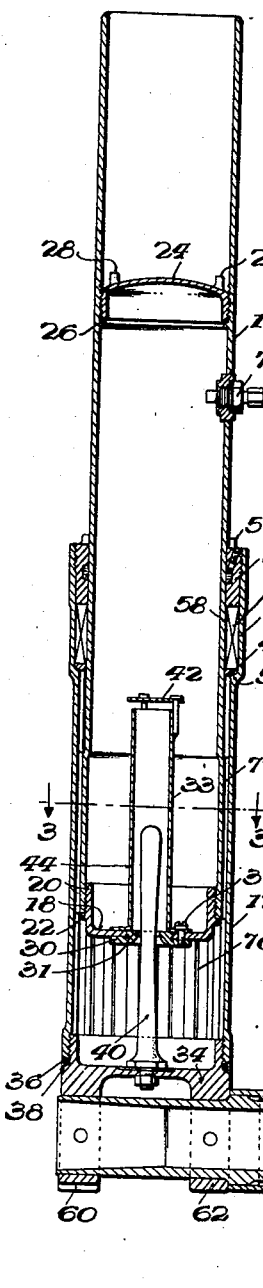
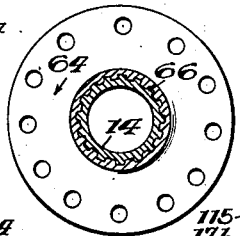
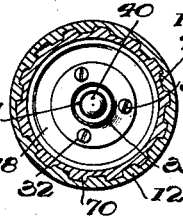
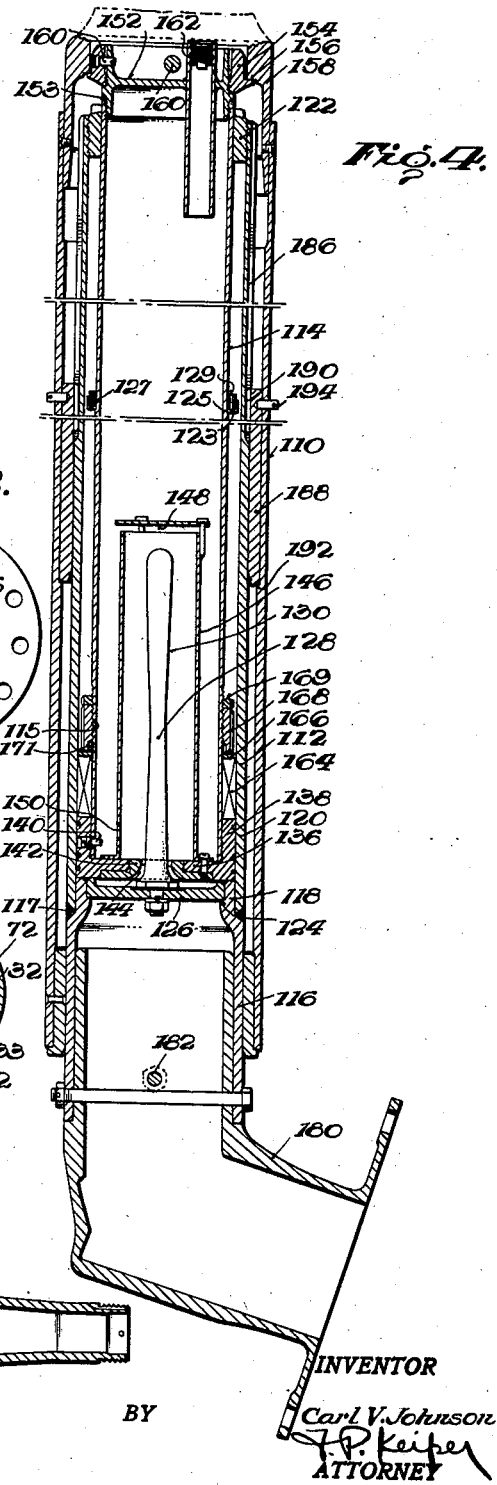
INVENTOR
Carl V. Johnson
BY
ATTORNEY

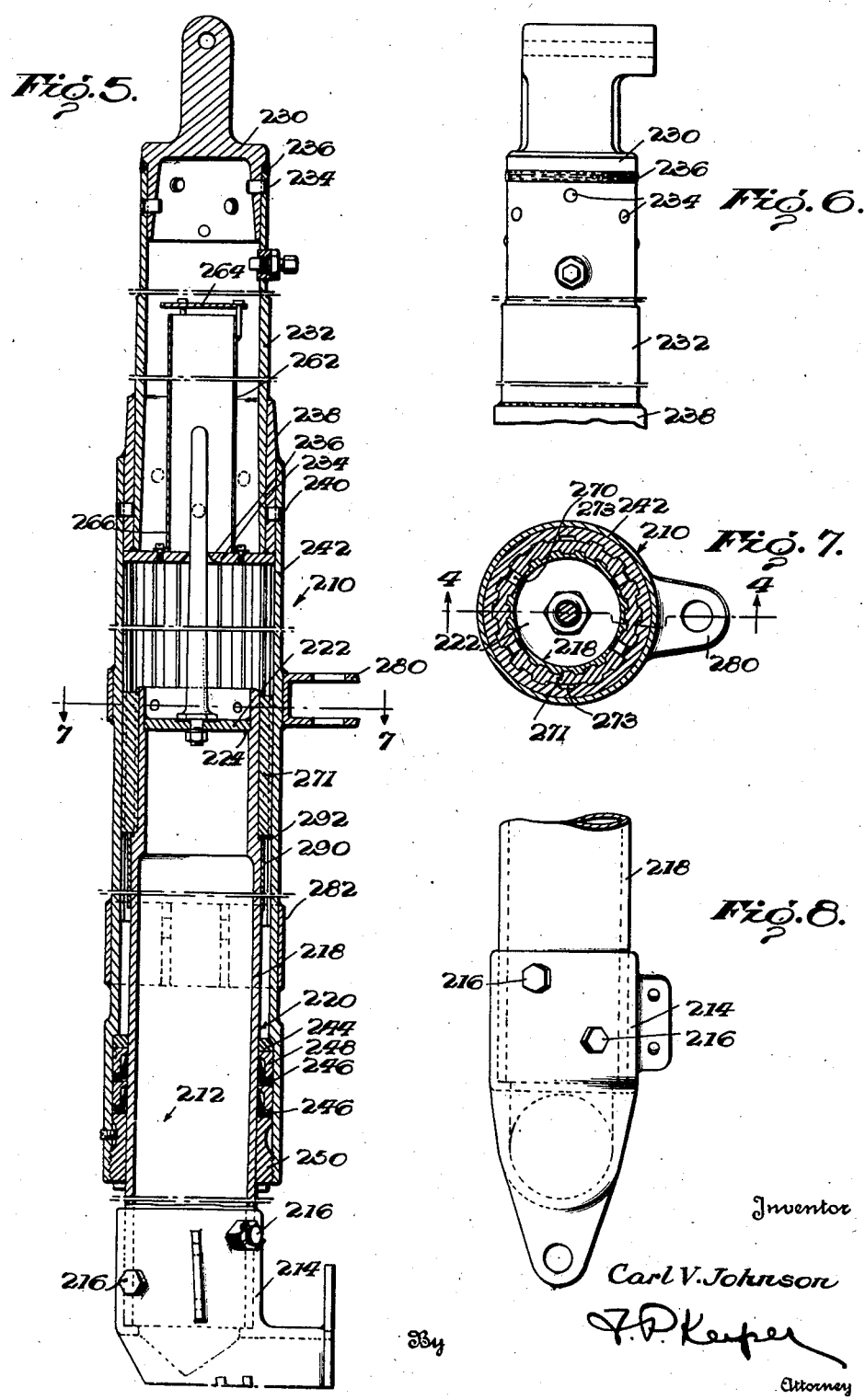

July 30, 1940.   C. V. JOHNSON   2,209,603
SHOCK STRUT
Filed Oct. 11, 1934   3 Sheets-Sheet 3
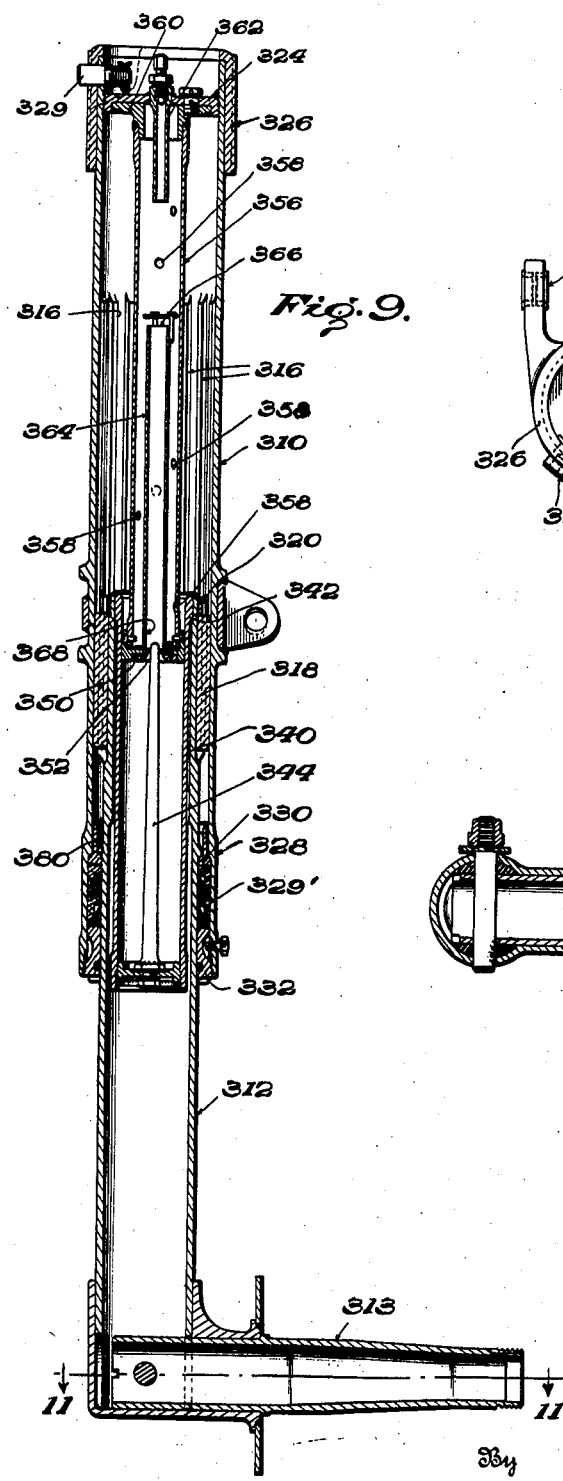
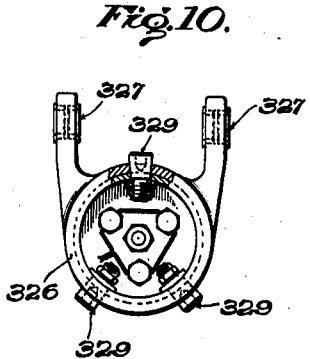
Fig. 10.
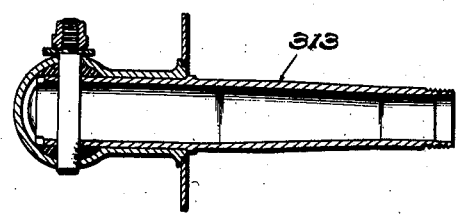
Fig. 11.
Inventor
Carl V. Johnson
By
Attorney Patented July 30, 1940

2,209,603

UNITED STATES PATENT OFFICE 2,209,603

SHOCK STRUT

Carl V. Johnson, South Bend, Ind., assignor to Bendix Products Corporation, South Bend, Ind., a corporation of Indiana Application October 11, 1934, Serial No. 747,993

5 Claims. (Cl. 267—64)

This invention relates to shock struts, and more particularly to shock struts designed for use in aircraft landing gears, and particularly a shock strut which is adapted to resist or transmit twisting forces as well as the usual compressive forces.

In aircraft landing gears it has been found desirable to employ shock struts which can transmit twisting or torsional forces so that each strut may project from the plane independently of any other strut and be free from cross axles or torsional braces fixed to the lower extremity of the strut, which braces, when heretofore employed, were necessarily connected to the movable part. The present invention is directed to struts of the telescopic chamber type wherein means are provided to resist torsional or twisting forces through the strut, and an important feature, among others, is the provision of such means which will be wholly enclosed, free from wear due to abrasive action of grit, dirt and other foreign matter.

It is accordingly an object of the invention to provide a shock strut having telescopic casings wherein improved means are provided to resist torsional or twisting forces throughout the stroke without interfering with the normal shock absorbing function.

A further object of the invention is to provide an improved shock strut having telescopic casings wherein splines are provided to resist torsional or twisting forces, the splines being so arranged as to be protected from exposure.

A further object of the invention is to provide an improved shock strut having telescopic casings and employing damping liquid with means to transmit twisting or torsional forces from one end to the other and employ the damping liquid as a lubricant for the means.

A further object of the invention is to provide in a shock strut of the telescopic casing, metering pin orifice type, means to prevent relative rotation of the parts so that the metering pin and its relation to the orifice may not be disturbed.

Still another object of the invention is to provide a shock strut having splined members which is of simplified construction, rugged and able to withstand the stresses incident to landing and taxiing, and particularly in which the splined members are easily formed.

The above and other novel features of the invention will appear more fully hereinafter from the following detailed description when taken in conjunction with accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 1 illustrates a longitudinal section of one form of shock strut embodying certain features of the invention;

Fig. 2 is a section taken on line 2—2 of Fig. 1 illustrating certain details of the lower end of the strut;

Fig. 3 is a section taken on the line 3—3 of Fig. 1 showing the details of the interengaging splines of Fig. 1;

Fig. 4 illustrates a longitudinal section of a modified form of shock strut showing certain features of the invention;

Fig. 5 illustrates a longitudinal section of another modified form of shock strut and illustrates certain features of the invention in a slightly varied form;

Fig. 6 is a side elevation of the top portion of the strut of Fig. 5;

Fig. 7 is a section through the spline taken on the line 7—7 of Fig. 5;

Fig. 8 is a side elevation of the lower end of the strut of Fig. 5;

Fig. 9 is a longitudinal section of a further modified form of shock strut;

Fig. 10 is a top view of the strut of Fig. 9, and

Fig. 11 is a horizontal section through the bottom of the strut taken on the line 11—11.

Referring to the drawings, and particularly Fig. 1, there is shown a shock strut having upper and lower tubular casing members 10 and 12 respectively, the upper member being adapted to be secured in a well known manner to the fuselage or framework of an airplane. The lower casing member 12 is provided at its lower end with a short horizontal stub axle 14 which is adapted to carry thereon a common form of wheel, not shown, suitable for aviation landing gear. The upper casing member 10, which telescopes within the casing member 12, is provided with a piston 18 at its lower end, which piston has an inturned flange 20, which is threaded into the interior of the casing member 10, the flange 20 being provided with an external shoulder 22 adapted to abut the end of the casing 10 when screwed in place. Within and adjacent the upper end of the casing is a bulkhead or diaphragm 24, which may be screwed in place against an annular internal shoulder 26, in the wall of the casing 10, the diaphragm having for the purpose lugs 28 adapted to be engaged by a suitable turning tool.

The piston 18 is preferably provided with a hardened bushing 30 having an orifice 31 set in an aperture in the center of the piston, and a housing tube 33 which extends upward and covers the orifice 31 of the bushing, is secured to the piston together with the bushing 30 by suitable fastening means such as screws 32.

In the bottom of the casing member 12 is provided an end closure member 34 which is threaded into the lower end of the casing member, the latter preferably being outwardly offset slightly to provide a shoulder for the end closure to abut when screwed in place. Preferably, to assure against possible relative rotation between the end closures in the casing 12, the members are welded together by flowing metal in the annular groove 36 between the end of the casing and the corresponding shoulder 38 on the end closure member.

In order to vary the effective area of the orifice 31 carried by the piston 18, a metering pin 40 having a suitable contour is secured at its lower end to the end closure member 34 and projects upward and through the orifice and cooperates therewith to change the effective area as the members reciprocate. The housing member 33 which is of approximately the length of the metering pin 40, is provided with a one-way valve 42 in its top and bleed apertures 44 in the side to permit free flow of fluid upward but control the flow of fluid through the orifice in reverse direction.

The upper end of the outer casing member 12 is provided with an enlarged diameter offset portion 46 in which is arranged a packing retaining ring 48 which rests against the shoulder 50 formed by the offset, packing material 52 and a packing nut 54 which is provided with suitable lugs 56 for engaging a suitable tool. The casing member 10 is provided with a smooth external wall 58 which is adapted to slidably engage the packing and cooperate therewith to prevent any leakage during the operation or use of the strut.

In order to simplify the construction of the landing gear in the bracing thereof, the axle 14 is secured directly to the end closure member 34 by means of the lugs 60 and 62 formed integral with the end closure member. A plate such as 64, to which may be secured braking members or a brake backing plate as will be well understood in the art is splined on the axle as at 66, as best shown in Fig. 2.

To resist torsional force, or twisting effect on the strut resulting from the shocks of landing and the effect of braking the rotation of the landing wheels, the casing members 12 and 10 are provided with interengaging splines. The casing member 12 is provided, as shown, with splines 70 extending from the end closure member 34 to the packing located at the upper end. The casing member 10, which reciprocates within the casing 12, is provided with a shorter spline 72, which splines are located adjacent the piston end of the casing and extend to the smooth surface 58 provided for engagement with the packing. The splines 72 preferably end abruptly and form a shoulder for engaging the packing retaining ring 48 to limit the extending movement between the casings 10 and 12 when the strut is unloaded, or extended.

The lower casing 12 of the strut, in practice, is substantially filled through a filler plug 74 with a hydraulic damping liquid which, upon landing, is forced through the orifice 31 to absorb shocks. It will be observed that the splines 70 and 72 are thus exposed to this damping liquid since the same are within the end closure formed by the casing 10 and 12 and the packing 46, and the presence of the damping liquid tends to lubricate the splines and protect the same from undue wear.

A modified form of strut, as shown in Fig. 4, wherein the upper casing member is outside of the lower casing member whereby a longer portion of the strut may be braced rigidly to the body or framework of the airplane, comprises an outer upper casing member 110 and a lower inner casing member 112. In order to conserve on the length of the strut and still provide substantial overlap of the telescoping members, an internal tubular member 114 is provided which is adapted to move simultaneously with the casing 110, the lower casing member 112 reciprocating between the tubular member 114 and casing 110.

The lower casing member 112 comprises an end sleeve 116 having an inwardly offset section 118 at the upper end thereof over which is secured by welding 117, a tubular member 120 extending upwardly into the strut and threadedly carrying an inner guide collar 122 at its upper end.

Seated on an internal shoulder 124 in the offset portion of the sleeve 116 is a diaphragm or end closure 126 which is adapted to carry a metering pin 128 varying in contour as at 130.

The tubular member 114, which is secured to the upper end of the strut and upon which the guide collar 122 slidably bears, carries at its lower end a piston 136 having an upwardly-extending flange 138 which is threaded on the exterior of the tubular member 114 and is keyed against rotation by a set screw 140 to prevent loosening. The piston 136 is provided with a hardened center piece 142 having an orifice 144 therein which is adapted to cooperate with the metering pin 128 and its variable contour 130, to effect a gradual change in the effective area of the orifice with relative movements. On the top side of the piston 136 is provided a tubular housing 146 having a flap valve 148 on the top thereof and one or more bleed ports 150 in the side wall.

The tubular member 114 is secured to the casing 110 by means of a flanged end closure 152 threaded and welded thereto as at 153 and a shouldered collar member 154 threaded to the latter and engaging an internal shoulder 156 of the end cap 158 forming the upper part of the casing 110. Pins 160 passing through the cap 158 and collar 154 secure the parts. A filler tube 162 having a plug is passed through the end closure 152.

To prevent leakage between the tubular member 114 and the casing 112, packing 164 is arranged on the tubular member 114 between the flange 138 of the piston and a packing retaining ring 166, which is held in any adjusted position by the nut 168 and lock nut 169 threaded on an exteriorly raised threaded portion 115 of the tube 114. The nut 168 is undercut as at 171 so that it may extend beyond the threads to the smooth portion of the tube 114 carrying the packing.

The lower end of the strut is shown as provided with a flanged member 180 which is secured to the sleeve 116 by means of pins or bolts 182, and to resist twisting movements or torsional stresses imposed upon the strut by a landing wheel or its brake secured to the angle flange member 180, interengaging splines are provided between the casing members 110 and 112, the casing member 112 being preferably provided at its upper end with splines 186 greater in length than the strut stroke. The member 110 is shown as provided with a collar having a bearing portion 188 and complementary splined portion 190. The bearing portion is shown as resting against a shoulder 192 in the interior of the casing member 110 and keyed to the casing by a plurality of pins such as 194.

The maximum extended position of the strut may be regulated by a suitable stop or bumper which may be seated against a shoulder 123 in the side wall of the member 114. As shown the bumper comprises an annular ring 125 upon which may be seated a rubber ring 127 in which holes 129 are provided to permit compression of the rubber to absorb shock when the same suddenly engages the collar 122.

There is illustrated in Fig. 5 a modified form of strut which is similar to but represents an inversion of the modification of Fig. 1. The same comprises, in general, an outer upper casing member 210 and an inner lower casing member 212 arranged to reciprocate with respect to one another. The lower casing member 212 comprises a wheel axle end fitting 214 secured by bolts 216 to a tubular member 218 having a smooth packing engaging exterior surface 220. Internally near the upper end of the casing 212 is carried a rigid diaphragm 222 seated on an annular internal shoulder 224.

The outer casing member 210, as shown, is constructed of a plurality of tubular members and comprises an end cap 230 having a cylindrical flange secured within an upper tube portion 232 by means of pins 234 and an annular weld 236 thereby providing an upper air chamber.

Against the lower end of the tubular member 232 is seated a plate 234 having an orifice 236 and sleeved on the outside of the lower end of the tubular member 232 is a short tubular member 238 to which is keyed by pins 240 the main tubular member 242 which extends downward over the inner lower casing member 212. The tubular members 232 and 238 are welded together at each end of the member 238 and the same form a shoulder in the main tubular member 242 for the piston 234. At the lower end of the tubular member 242 there is provided an enlarged offset portion which provides a space for a packing including a packing retaining ring 244, washers 246, pressure members 248 and a packing nut 250, the packing engaging the smooth exterior surface 220 on the tubular member 218.

As similarly described in connection with the other modifications, the diaphragm 222 carries a metering pin of a chosen contour which is adapted to cooperate with the orifice 236. To control the return flow of fluid through the orifice, a housing member 262 having a flap valve 264 and one or more bleed ports 266 is provided.

In order to prevent relative rotation between the casing members 210 and 212, the main casing member 210 on its inner surface is splined for a considerable distance between the plate or diaphragm 234 and the packing chamber in the lower end. The casing member 212 is slightly reduced in its exterior diameter and is splined for the reception of a cylindrical member 271 having internal and external splines complemental to the splines of members 212 and 210 respectively. This latter cylindrical splined member is suitably secured by pins 270 to the casing member 212 and seats against a flange 292 on a sleeve member 290, which in turn engages the shoulder formed by the reduced diameter splined portion of casing 212. The cylindrical splined member 271 is constructed of a special metal for slidably engaging the internal splines of the member 210.

In order to brace the upper casing member 210 suitable belly bands 280 and 282 are provided to which may be secured guy wires and brace rods.

A further modification is illustrated in Fig. 9 wherein the upper air chamber comprises the outer casing member, the construction being such that the upper casing member may be conveniently braced over its entire length, since all reciprocating parts are within. This latter feature is also true of the structures of Figs. 4 and 5.

The construction comprises an upper outer cylindrical casing member 310 provided at its upper end with an end closure member 324 and an external sleeve 326 having attaching lugs 327, the sleeve being secured to the strut end by taper pins 329. At its lower end is an increased diameter portion 328 offset to receive a packing 329' arranged between a packing retaining ring 330 seated on the offset and a retaining nut 332 threaded into the lower end of the casing member 310.

Arranged to reciprocate within the outer upper casing member is a second lower reciprocating casing member 312 of cylindrical form, the latter slidably engaging the packing of the casing 310 in fluid tight manner. The lower end of the member 312 is shown as provided with a wheel axle 313.

The inner wall of the casing 310 is provided with splines 316 which are adapted to engage complementary splines of a sleeve 318 secured to the upper end of the casing 312, the sleeve being preferably splined on the latter and secured by the threaded collar 320. Relative rotation is thus prevented between the members 312 and 310.

To prevent the drawing of a vacuum in the annular space between the casings 310 and 312, the packing and the inner engaging splines which vacuum might suck air past the packing 329', and yet to permit a snug sliding fit between the spline members so they may not act as an orifice, one or more splines may be omitted on one member without the omission of its corresponding groove on the other member, thereby affording free communication between the chambers and the annular space leading to the packing. Such an arrangement is illustrated in conjunction with the modification of Fig. 5 in Fig. 7 by the unfilled grooves 273 and may obviously be applied to the other modifications, and particularly those of Figs. 1 and 9.

Depending within and from the upper end of the inner casing member 312, is an inner tube 340 having an external shoulder 342 at its upper end seating within and against a complementary shoulder within the casing member 312. The inner tube at its lower end is provided with a diaphragm on which is centrally supported a metering pin 344. To secure the casing, tube and diaphragm permanently, annular ringwelds between the members are preferably employed.

A piston 350 having an orifice 352 is arranged to cooperate with the metering pin 344, and reciprocate in the inner tube 340, the piston being supported from the end closure member 324 at the top of the casing member 310, by means of a tube 356 which is suitably perforated along its length as at 358 to permit free flow in and out thereof. The tube 356 is secured to the end closure member 324 by a flange plate 360, having a central aperture through which extends a filler tube 362 arranged centrally in the end closure 324.

A tubular housing 364 with a check valve 366 therein is secured over the orifice 352, and provides a housing for the metering pin. An orifice or bleed port 368 may be provided in the housing to permit gradual extension of the strut, rapid extension being prevented or snubbed by the closing of the check valve.

Maximum extension of the strut is controlled by a shoulder 380 on the casing member 312 which is adapted to engage the packing retaining ring 330, thus limiting movement between the casings.

In operation, each of the modifications is similar in that, upon landing, liquid which fills the strut to a level above that of the orifice is forced from the lower chamber below the orifice carrying member through its orifice and through the one-way valve into the upper chamber further compressing air in the top which is already under a suitable high pressure in the order of 30 or 40 atmospheres, the pressure depending upon the diameter of the strut and the weight to be carried. After the initial shock has been absorbed, the compressed air supports the load of the plane resiliently during taxiing and the flap valve 264 prevents the compressed air in the strut from causing rebound since the bleed ports 266 are provided to regulate the rate of extension of the strut after the initial shock has been absorbed and the strut tends to extend gradually to an equilibrium, such that the air pressure within is just sufficient to support the load. When the airplane takes off and the load is relieved, the modification of Fig. 1 is such as to permit the strut to extend until the shoulder formed by the end of the splines engages the packing ring, after which further extension is prevented except that permitted by the compressibility of the packing. Fig. 5 is similar in this respect except that the annular spacer sleeve 290 engages the packing retaining ring. In Fig. 4 the annular rubber ring 127 provides a limit for the extension movement, Fig. 9 is like Fig. 5.

It will thus be seen that a shock strut is provided wherein relative rotation between the members is prevented and the structure provided therefor is totally enclosed and in the modifications of Figs. 1, 5 and 9 is subjected to the lubricating qualities of the damping liquid employed in the strut itself. Thus the wearing surfaces are enclosed and protected from the entrance of foreign matter and are maintained against undue wear. As will now be readily appreciated such a strut permits the mounting of a wheel directly upon a bracket rigidly secured to the lower telescopic member and such a construction merely requires that the upper telescopic member be adequately secured and braced to the fuselage or wing of the plane thereby permitting the independent mounting of one wheel with respect to the other and also doing away with the necessity of interconnecting axles or providing torque arms extending to the movable or reciprocable part of the shock strut.

Although but four embodiments of the invention have been illustrated and described, it is to be understood that the invention is not to be limited thereto but may be embodied in other mechanical arrangements and forms. For example, the various features of any one of the modifications might be substituted for those of the other modifications. As such and other changes in construction and arrangement may be made without departing from the spirit of the invention as will be apparent to those skilled in the art, reference will be had to the appended claims for a definition of the limits of the invention.

What is claimed is:

1. A shock absorbing strut for aircraft comprising a pair of telescopic tubular members, the outer member being closed at its lower end, having a packing on its upper end, and having internal splines extending substantially from the lower end thereof to the packing, the inner member being closed adjacent its upper end, and having an orificed piston at its lower end, said lower end having a sleeve secured thereon which is provided with external splines adapted to engage said internal splines and prevent rotation between the members.

2. In a fluid shock absorber, inner and outer telescoping cylinders, the inner cylinder having a smooth exterior except at its inner end and the outer cylinder having a packing at its inner end engaging over said smooth exterior, the inner cylinder having removable and replaceable splines at its inner end, and the outer cylinder having relatively extensive spline grooves behind said packing.

3. In a shock absorber, a pair of telescoping cylinders having interengaging spline portions, the spline portion of one cylinder being in the form of a sleeve attached to its cylinder in a manner to prevent rotation thereupon, and formed of a different metal than the other spline portion.

4. In a shock absorber, a pair of telescoping cylinders, one of said cylinders having an integral spline portion, and the other cylinder having a sleeve spline portion attached thereto and secured against rotation thereupon, and cooperating with said first named spline portion, the spline portions of the two cylinders being formed of different metals.

5. In a shock absorber, a pair of telescoping cylinders, one of said cylinders having an integral spline portion, and the other cylinder having a sleeve spline portion attached thereto and secured against rotation thereupon, and cooperating with said first named spline portion, said sleeve being formed of a different metal from that of the first named cylinder.

CARL V. JOHNSON.